US008862768B2

(12) United States Patent
Diab et al.

(10) Patent No.: US 8,862,768 B2
(45) Date of Patent: Oct. 14, 2014

(54) METHOD AND SYSTEM FOR PACKETIZING DATA FOR SERVICING TRAFFIC END-TO-END

(75) Inventors: Wael William Diab, San Francisco, CA (US); Bruce Currivan, Dove Canyon, CA (US); Jeyhan Karaoguz, Irvine, CA (US); Yongbum Kim, San Jose, CA (US); Kenneth Ma, Cupertino, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 225 days.

(21) Appl. No.: 12/581,741

(22) Filed: Oct. 19, 2009

(65) Prior Publication Data

US 2011/0022721 A1    Jan. 27, 2011

Related U.S. Application Data

(60) Provisional application No. 61/228,309, filed on Jul. 24, 2009.

(51) Int. Cl.
*G06F 15/16* (2006.01)
*H04L 29/08* (2006.01)
*H04L 29/06* (2006.01)

(52) U.S. Cl.
CPC .............. *H04L 69/08* (2013.01); *H04L 69/324* (2013.01); *H04L 69/32* (2013.01)
USPC ......................................................... 709/233

(58) Field of Classification Search
CPC ...................................................... H04L 47/31
USPC ............................................ 709/233; 370/389
See application file for complete search history.

(56) References Cited

U.S. PATENT DOCUMENTS

| 6,567,406 | B1 * | 5/2003 | Skemer ......................... 370/392 |
| 7,555,546 | B1 * | 6/2009 | Anumala ....................... 709/224 |
| 7,940,756 | B1 * | 5/2011 | Duffy et al. ................... 370/389 |
| 2002/0080786 | A1 * | 6/2002 | Roberts ......................... 370/389 |
| 2003/0191841 | A1 * | 10/2003 | DeFerranti et al. ........... 709/226 |
| 2004/0198360 | A1 * | 10/2004 | Kotzin .......................... 455/445 |
| 2005/0002333 | A1 * | 1/2005 | Aalders et al. ................ 370/230 |
| 2005/0036488 | A1 * | 2/2005 | Kalkunte et al. ............. 370/389 |
| 2005/0220096 | A1 * | 10/2005 | Friskney et al. .............. 370/389 |
| 2007/0201499 | A1 * | 8/2007 | Kapoor et al. ................ 370/412 |
| 2008/0291827 | A1 * | 11/2008 | Xiong et al. ............... 370/230.1 |
| 2009/0213858 | A1 * | 8/2009 | Dolganow et al. ......... 370/395.5 |

* cited by examiner

*Primary Examiner* — Boris Gorney
(74) *Attorney, Agent, or Firm* — Brinks Gilson & Lione (57) ABSTRACT

Aspects of a method and system for packetizing data for servicing traffic end-to-end are provided. In this regard, a networking subsystem may receive, from an application, one or more values of one or more parameters associated with data generated by the application. The networking subsystem may packetize the data into one or more packets. The networking subsystem may translate the received one or more values into one or more corresponding OSI layer 2 tags. The networking subsystem may tag the one or more packets with the corresponding OSI layer 2 tags and transmit the tagged packet(s) to one or more link partners. The link partners may thus process and forward the tagged packet(s) by inspecting only OSI layer 2 information of the tagged packet(s). The one or more corresponding OSI layer 2 tags may indicate, for example, quality of service required by, and/or protocols associated with, the data.

21 Claims, 6 Drawing Sheets

METHOD AND SYSTEM FOR PACKETIZING DATA FOR SERVICING TRAFFIC END-TO-END

CROSS-REFERENCE TO RELATED APPLICATIONS/INCORPORATION BY REFERENCE

This patent application makes reference to, claims priority to and claims benefit from United States Provisional Patent Application Serial No. 61/228,309 filed on Jul. 24, 2009.

This patent application also makes reference to: U.S. patent application Ser. No. 61/228,432 filed Jul. 24, 2009 and U.S. patent application Ser. No. 12/571,165 filed on Sep. 30, 2009.

Each of the above stated applications is hereby incorporated herein by reference in its entirety.

FIELD OF THE INVENTION

Certain embodiments of the invention relate to networking. More specifically, certain embodiments of the invention relate to a method and system for packetizing data for servicing traffic end-to-end.

BACKGROUND OF THE INVENTION

A electronic communication network is a collection of two or more computing nodes, which are communicatively coupled via a transmission medium and utilized for transmitting information. Most networks adhere to the layered approach provided by the open systems interconnect (OSI) reference model. The OSI reference provides a seven (7) layer approach, which includes an application layer, (Layer 7), a presentation layer (layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. Some networks may utilize only a subset of the 7 OSI layers. For example, the TCP/IP model, or Internet Reference model generally utilizes a 5 layer model, which comprises an application layer, (Layer 7), a transport layer (Layer 4), a network layer (Layer 3), a data link layer (Layer 2) and a physical layer (Layer 1). These five layers can be broken down into a fairly specific set of responsibilities or services, which they provide.

As electronic communication networks become increasingly popular, ways of exchanging data of various types, sizes for a variety of applications and business and consumers alike want network access on more and more devices. Moreover, consumers and business continually want faster network access and/or greater bandwidth on all of their communication devices. Consequently, communicating the increased amounts of data across a network present many challenges to network and system designers and administrators.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for networking, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for packetizing data for servicing traffic end-to-end. In various embodiments of the invention, a networking subsystem may receive, from an application, one or more values of one or more parameters associated with data generated by the application. The networking subsystem may be operable to packetize the data into one or more packets. The networking subsystem may translate the received one or more values into one or more corresponding OSI layer 2 tags. The networking subsystem may tag the one or more packets with the corresponding OSI layer 2 tags and transmit the tagged packet(s) to one or more link partners. The link partners may thus process and forward the tagged packet(s) by inspecting only OSI layer 2 information of the tagged packet(s). The value(s) of the parameter(s) may be translated based, at least in part, on other data being communicated by the networking subsystem. The received data from the application and the other data being transmitted by the networking subsystem may be prioritized by the networking subsystem.

The parameter values may be stored in memory within the networking subsystem, wherein the memory may comprise corresponding values of the one or more parameters associated with each of one or more applications. The one or more corresponding OSI layer 2 tags may indicate a quality of service (QoS) required for communicating the data to the one or more link partners. The one or more corresponding OSI layer 2 tags may indicate one or more of: OSI layer 3 protocols, OSI layer 4 protocols, OSI layer 5 protocols, OSI layer 6 protocols, and/or OSI layer 7 protocols utilized for generating the one or more packets. The one or more corresponding OSI layer 2 tags may identify the application generating the data. The data may be associated with multiple datastreams and each of the multiple datastreams may be associated with different ones of the received one or more values. The parameter values may be translated into the one or more tags via dedicated hardware in the networking subsystem. The values of the parameters may be determined by a link partner to which the one or more packets are communicated.

Figure 1:
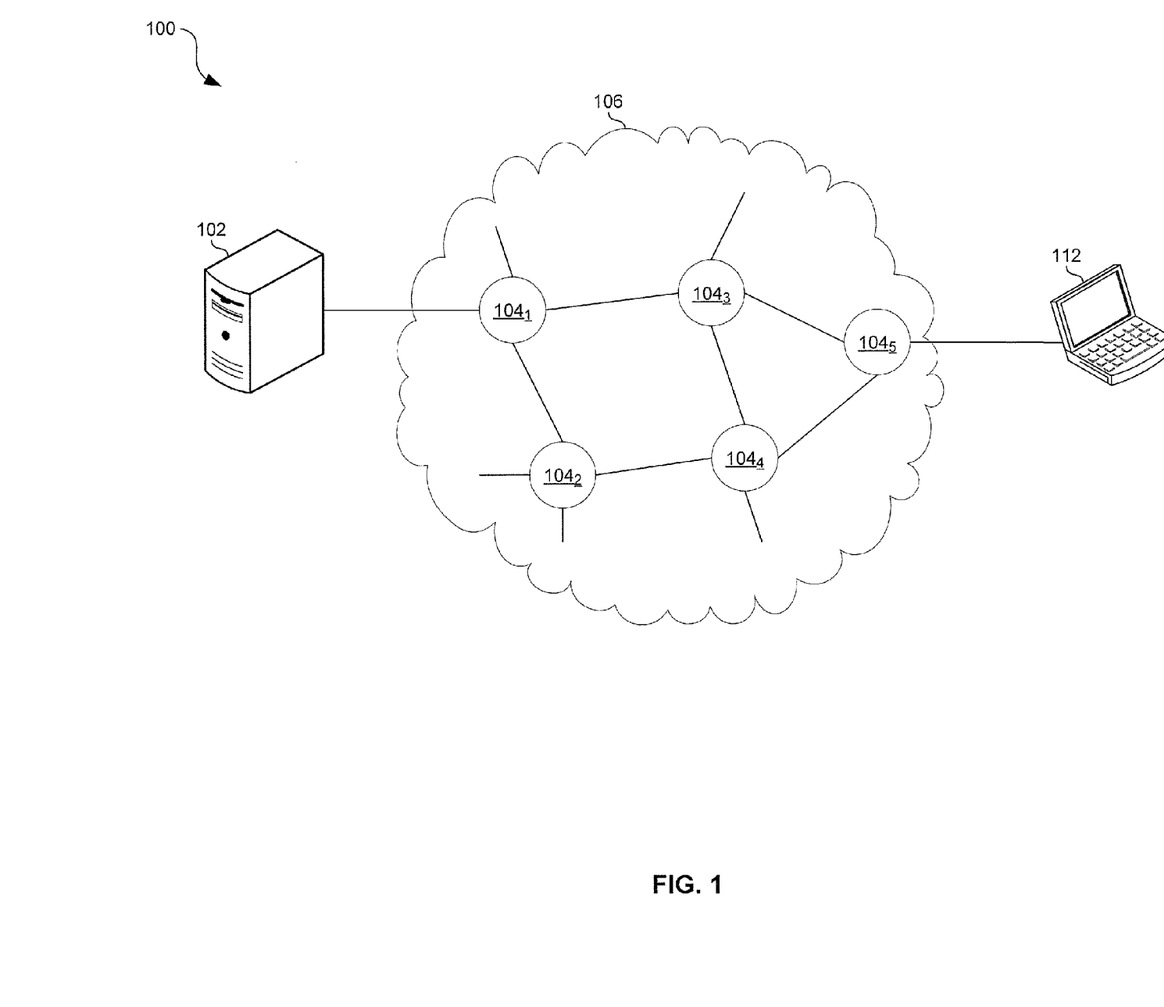
FIG. 1 is a diagram illustrating a network in which the delivery of information may be controlled based on OSI layer 2 tags generated from application layer parameters, in accordance with an embodiment of the invention.

FIG. 1 is a diagram illustrating a network in which the delivery of information may be controlled based on OSI layer 2 tags generated from application layer parameters, in accordance with an embodiment of the invention. Referring to FIG. 1, there are shown network devices 102 and 112 which communicate via the network 106, which comprises network devices 104.

Each of the network devices 102 and 104, referenced herein as end-systems 102 and 112, may comprise suitable logic, circuitry, interfaces, and/or code that may be operable to implement OSI layers 1 through 7. In this regard, the end-systems 102 and 112 may be operable to run one or more applications that generate, transmit, and/or receive data communicated over the network 106. Various protocols may be utilized for generating the data and formatting, packetizing, and/or otherwise processing the data as it is conveyed down through the OSI stack.

In operation, the end-systems 102 and 112 may be operable to exchange data via the network 106. For example, a datastream may be generated and packetized in the end-system 112 and the resulting packets may be communicated across the network to the end-system 102. In this regard, the end-system 112 may transmit the packets to the network device $104_5$ which may inspect the packet to determine how to service or handle the packet. That is, packet inspection may be utilized by the network devices 104 to determine, for example, a quality of service required by the packets, and/or protocols utilized in generating the packets. Based on the packet inspection, the network devices 104 may be operable to determine how to service or handle the packets. Determining how to service or handle the packets may comprise, for example, determining processing cycles to allocate for processing the packets, determining memory to allocate for buffering the packets, determining which queue(s) to buffer the packets in, determining how long the packets may be buffered, determining which link to forward the packets onto, determining a data rate at which to communicate the packets, and determining whether and/or when the network device 104 may operate in an energy saving mode.

In conventional network devices, packet inspection may comprise inspecting information associated with each OSI layer sequentially. For example, after OSI layer 2 information is inspected, the layer 2 information may be stripped off and the OSI layer 3 information may be inspected and the process may repeat inspecting and stripping off information for one or more of the OSI layers up to layer 7. Such "deep packet inspection" is often undesirable because it is resource intensive. Accordingly, aspects of the invention may enable the tagging of packets at OSI layer 2 such that the network devices 104 may determine how the packets should be serviced or handled based only on inspection of the OSI layer 2 information. In some embodiments of the invention, the tags may be selected from a standard list or menu of which the network devices 104 may be aware. In some embodiments of the invention, the tags and/or the meaning of the tags may be communicated to the network nodes utilizing a network management protocol such as SNMP or LLDP. In some embodiments of the invention, the tags may mean different things in different networks. For example, when the end-system 112 is connected to a first service provide or content provider, one or more tags may have a first meaning and when the end-system 112 is connected to a second service provide or content provider one or more tags may have a second meaning. Similarly, a first set of tags may be used by the end-system 112 when it is connected to a first network or type of network, and a second set of tags may be utilized when the end-system 112 is connected to a second network or type of network.

Figure 2:
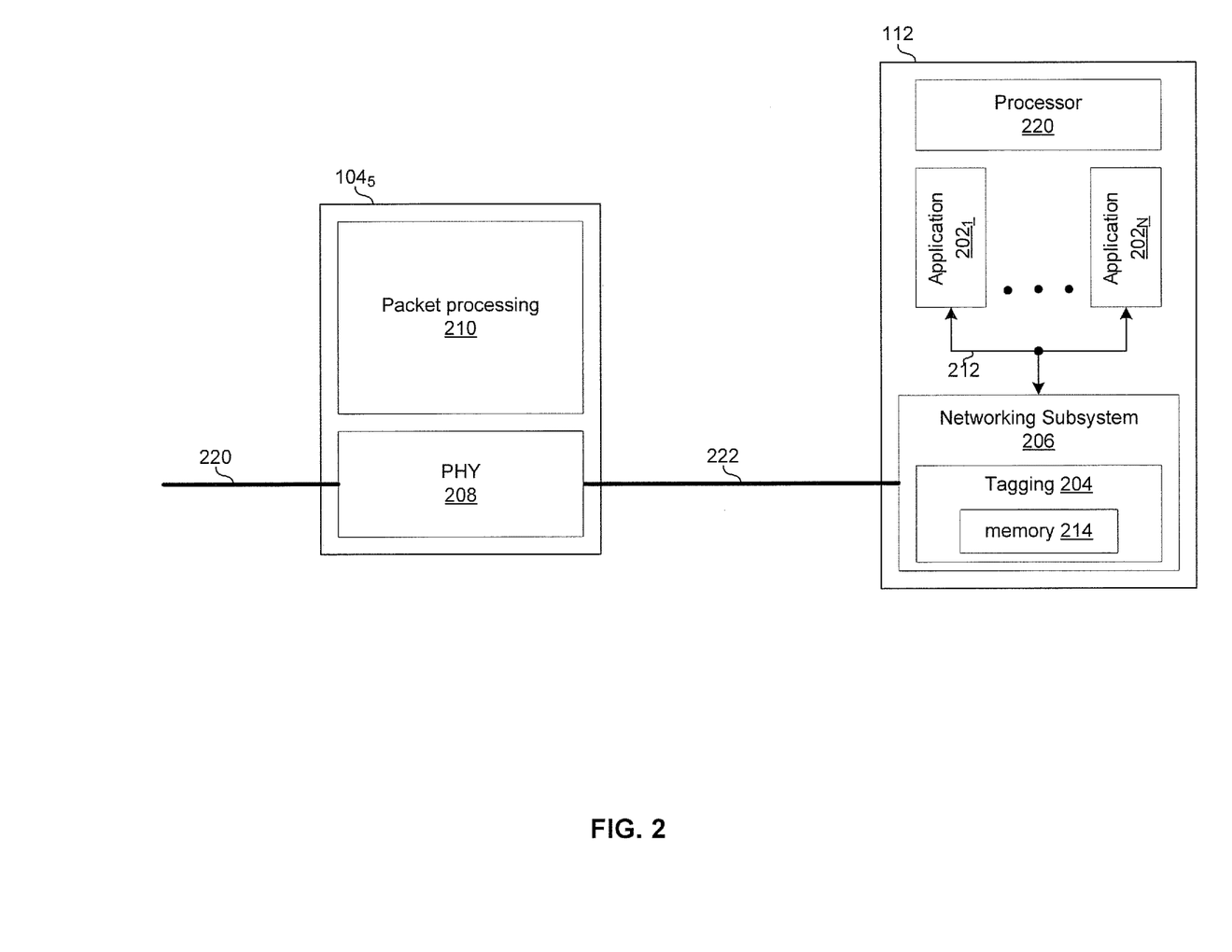
FIG. 2 is a functional block diagram illustrating network devices which may utilize standardized parameters and corresponding tagging for managing the delivery of information, in accordance with an embodiment of the invention.

FIG. 2 is a functional block diagram illustrating network devices which may utilize standardized parameters and corresponding tagging for managing the delivery of information, in accordance with an embodiment of the invention. Referring to FIG. 2 there is shown the end-system 112 and the network device $104_5$ described with respect to FIG. 1. The network device $104_5$ may communicate with the end-system 112 via a physical link 222 and communicate with other network devices via a physical link 220. The links 220 and 222 may each comprise, for example, optical fiber, copper wire, or backplane.

The applications $202_1$-$202_N$ running on the end-system 112 may interface to the networking subsystem 206 via an interface 212 and the tagging module 204. The applications $202_1$-$202_N$ may comprise any processes, services, and/or programs running on the end-system 112. The applications $202_1$-$202_N$ may be executed by the processor 220.

The processor 220 may each comprise suitable logic, circuitry, interfaces, and/or code that may be operable to process data and/or control operations of the network device 112. With regard to processing data, the processor 220 may enable packetization, de-packetization, transcoding, reformatting, and/or otherwise processing data received from and/or to be transmitted by the networking subsystem 206. With regard to controlling operations of the network device 112, the processor 220 may be operable to provide control signals to the various other portions of the network device 112. The processor 220 may also control data transfers between various portions of the network device 112. The processor 220 may enable execution of applications programs and/or code. In this regard, the applications, programs, and/or code may enable, for example, generating, parsing, transcoding, or otherwise processing data. Furthermore, the applications, programs, and/or code may enable, for example, configuring or controlling operation of the networking subsystem 206.

The networking subsystem 206 may comprise suitable logic, circuitry, and/or code that may be operable to transmit and receive data in adherence to one or more networking standards. The networking subsystem 206 may be operable to transmit and/or receive data via, for example, a T1/E1 line, a passive optical network, DSL, a cable television infrastructure, a satellite broadband internet connection, a satellite television infrastructure, a cellular network, Bluetooth, wireless Ethernet, WiMAX, and/or wired Ethernet. The networking subsystem 206 may be operable to implement, switching, routing, and/or network interface card (NIC) functions. In this regard, the networking subsystem 206 may implement physical layer functions, data link layer functions, and may implement functions associated with OSI layer 3 and/or higher OSI layers.

The tagging module 204 may comprise suitable logic, circuitry, and/or code that may be operable to receive parameters from the applications $202_1$-$202_N$ and process the received parameters to translate the parameters into one or more OSI layer 2 tags. In various embodiments of the invention, the tagging module 204 may comprise dedicated hardware for translating received parameters into one or more tags. The tagging module 204 may be a pluggable device such that the networking subsystem 206 may be manufactured without the tagging module 204 and the tagging module 204 may be installed later. In various embodiments of the invention, the tagging module 204 may comprise one or more software functions or routines that may translate received parameter into one or more OSI layer 2 tags.

The network device $104_5$ may comprise suitable logic, circuitry, interfaces, and/or code that may be operable to service or handle packets tagged in accordance with various embodiments of the invention. The network device $104_5$ may comprise a physical layer device (PHY) 208 and a packet processing module.

The PHY 208 may comprise suitable logic, circuitry, interfaces, and/or code that may be operable to transmit and receive physical layer signals via a physical communication link. In this regard, the PHY 208 may receive packets from the packet processing module 210, convert the packets into physical layer signals and impress corresponding voltage(s) and/or current(s) on the physical medium. Similarly, the PHY 208 may be operable to receive physical layer signals via one or more physical links, convert the signals into packetized digital information, and convey the packets to the packet processing module 210.

The packet processing module 210 may comprise suitable logic, circuitry, interfaces and/or code that may be operable to inspect packets, buffer packets, transcode packets, and forward packets. In this regard, the packet processing module 210 may be operable to inspect packets and service the packets based on the inspection.

In operation, the applications $202_1$-$202_N$ may generate a plurality of datastreams to be transmitted via the network device $104_5$. To ensure the datastreams are properly serviced and/or handled by the network device $104_5$ (and downstream network devices not shown in FIG. 2) each of the applications $202_1$-$202_N$ may provide one or more parameter values to the networking subsystem 206 for each of the datastreams it generates. The parameter values may be selected from a predefined set of values supported by the networking subsystem.

When an application selects the appropriate parameter values for a datastream it generates, the application may communicate the parameter values to the networking subsystem. The parameters may be communicated to the networking subsystem 206 in a manner similar to or the same as the manner in which the datastream is communicated to the networking subsystem 206. For example, the parameters may be communicated to the networking subsystem 206 via a bus 212 which may be, for example, a PCI, PCI-E, or PCI-X bus. Accordingly, the networking subsystem 206 may be operable to distinguish parameters on the bus 212 from data on the bus 212. The parameters may be translated to corresponding tags by the tagging module 204 and the corresponding tags may be inserted into packets comprising data from the corresponding datastream.

In one exemplary embodiment of the invention, the tagging module 204 may comprise dedicated hardware and may be configured based on the parameters. In this regard, translation of the parameters to corresponding tags may be accomplished by the configuration of, for example, one or more memory elements 214 of the tagging module 204. The memory elements 214 may comprise, for example, one or more flip-flops, latches, registers and/or blocks of memory such as RAM, ROM, and/or flash.

In another exemplary embodiment of the invention, the parameters associated with a datastream, or a hashed or processed representation thereof, may be input to a look-up table and corresponding tags may be read from the look-up table.

Figure 3A:
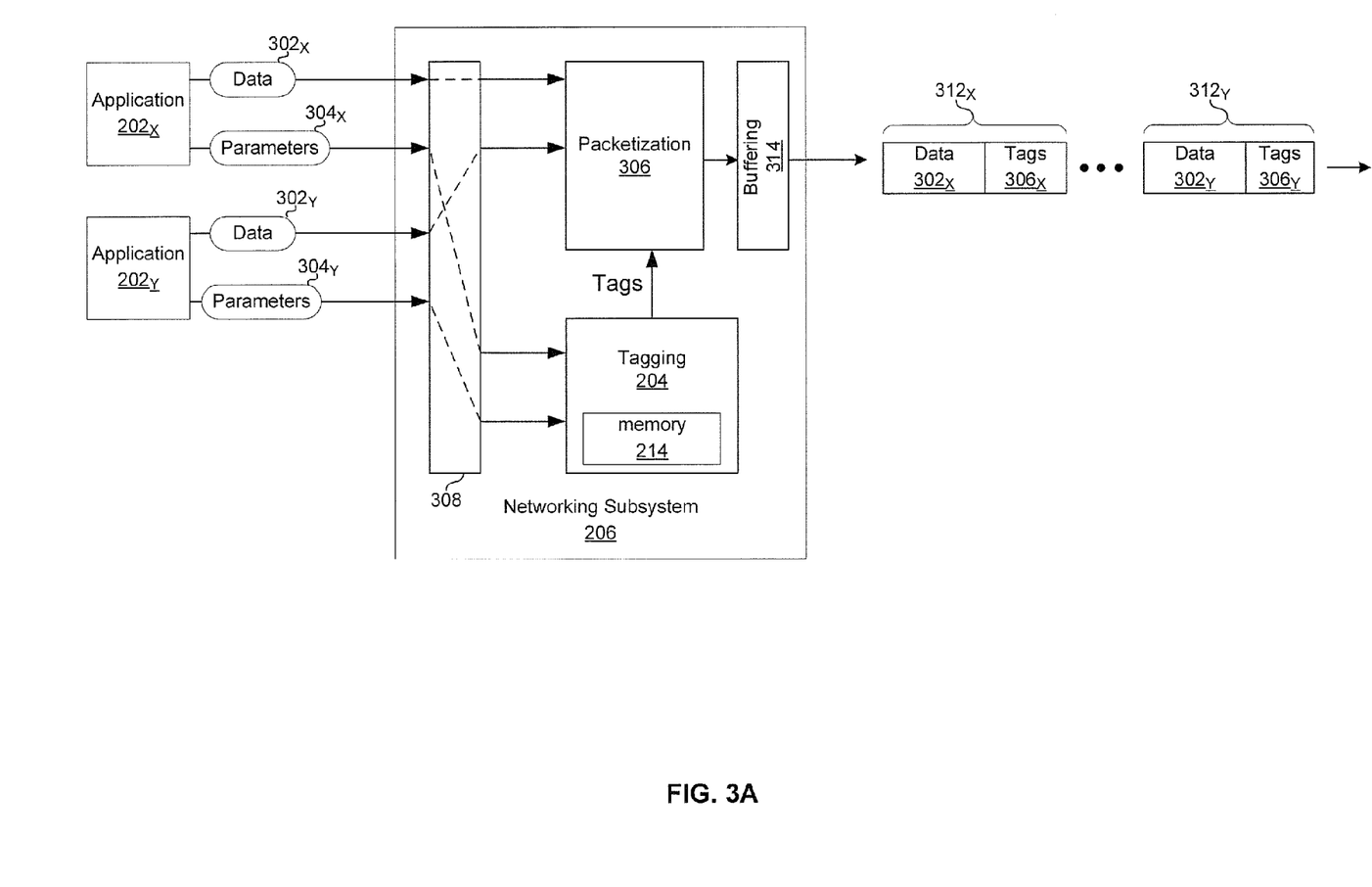
FIG. 3A is a block diagram illustrating packetization utilizing OSI layer 2 tags generated from application layer parameters, in accordance with an embodiment of the invention.

FIG. 3A is a block diagram illustrating packetization utilizing OSI layer 2 tags generated from application layer parameters, in accordance with an embodiment of the invention. Referring to FIG. 3A there is shown applications $202_X$ and $202_Y$ communicating datastreams $302_X$ and $302_Y$ and corresponding parameter values $304_X$ and $304_Y$ to the networking subsystem 206 which, in turn, generates corresponding packets $312_X$ and $312_Y$.

The applications $202_X$ and $202_Y$ may be two exemplary embodiments of the applications $202_1$-$202_N$ described with respect to FIG. 2. The datastreams $302_X$ and $302_Y$ may comprise, for example, multimedia content.

The networking subsystem 206 may comprise the tagging module 204 a bus interface 308, a packetization module 306, and buffering module 314. The tagging module 204 may be as described with respect to FIG. 2 and may comprise the memory 214, which may store tags and/or parameters associated with datastreams communicated by the networking subsystem 206. In this regard, exemplary information stored in the memory 214 is described below with respect to FIG. 3B.

The bus interface 308 may comprise suitable logic, circuitry, and/or code that may be operable to convey incoming data to the packetization module 306 and incoming parameters to the tagging module 204. For example, parameters may be communicated along with one or more control characters and/or identifying signals of bit sequences that may enable the bus interface 308 to distinguish the parameters from data to be transmitted.

The packetization module 306 may comprise suitable logic, circuitry, interfaces, and/or code that may be operable to generate OSI layer 2 packet streams. The packetization module 306 may be operable to receive the datastream, divide the received data into chunks suitable for an OSI layer 2 protocol implemented by the networking subsystem 206, and encapsulate the data by appending one or more headers and/or trailers to the data. In this regard, the headers and/or trailers may comprise one or more tags that may be generated by the tagging module 204. Notwithstanding, the invention is not limited with regard to how data is packetized and/or where and/or how the packets are marked and/or tagged. An exemplary OSI layer 2 protocol utilized by the networking subsystem 206 is Ethernet. In many instances, the datastream may have been previously encapsulated in one or more protocol data units (PDUs) associated with one or more higher OSI layer protocols. Nevertheless, the packetization module 306 may still packetize the PDUs into an OSI layer 2 packet stream.

The buffering module 314 may comprise suitable logic, circuitry, interfaces, and/or code that may be operable store packets awaiting transmission. In some embodiments of the invention, a queue in which each packet may be buffered may be determined based on corresponding tags for each of the packets.

In operation, datastream $302_X$ and corresponding parameters $304_X$ may be generated by the application $202_X$. Similarly, the datastream $302_Y$ and corresponding parameters $304_Y$ may be generated by the application $202_Y$. During generation and/or communication to the networking subsystem 206, the datastreams $302_X$ and $302_Y$ may be packetized and/or otherwise processed in accordance with one or more protocols running at one or more of OSI layer 3 through OSI layer 7. The bus interface 308 may convey the datastreams $302_X$ and $302_Y$, or protocol data units (PDUs) comprising the datastream, to the packetization module 306 and convey the parameters $304_X$ and $304_Y$ to the tagging module 204.

The tagging module 204 may be operable to generate tags $306_X$ based, at least in part, on the parameters $304_X$ and generate the tags $306_Y$ based, at least in part, on the parameters $304_Y$. In some embodiments of the invention, the tags $306_X$ may also be based, at least in part, on the parameters $304_Y$, and the tags $306_Y$ may also be based, at least in part, on the parameters $304_X$. In this regard, taking parameters $304_X$ and $304_Y$ into account when tagging each of the datastreams $302_X$ and $302_Y$ may enable, for example, prioritizing the datastreams and/or determining how to best optimize resources for communicating both datastreams. Accordingly, the tags may provide an indication to link partners receiving the packets as to how to prioritize and/or otherwise service the packets. Optimizing resources may comprise, for example, determining which and/or how many processing cycles to allocate for each of the datastreams 302, determining which buffers and/or how much buffering to allocate to each datastream 302, and choosing network paths for each datastream 302. In some embodiments of the invention, once the tags $306_X$ and $306_Y$ have been generated based on the datastreams 302, they may be provided to the packetization module 306 and may, in some instances, be stored in the memory 214.

The packetization module 306 may be operable to packetize the two datastreams, insert the tags $306_X$ and $306_Y$ into the corresponding packets $312_X$ and $312_Y$, and buffer the packets $312_X$ and $312_Y$ in the buffering module 314 while the packets await transmission.

Figure 3B:
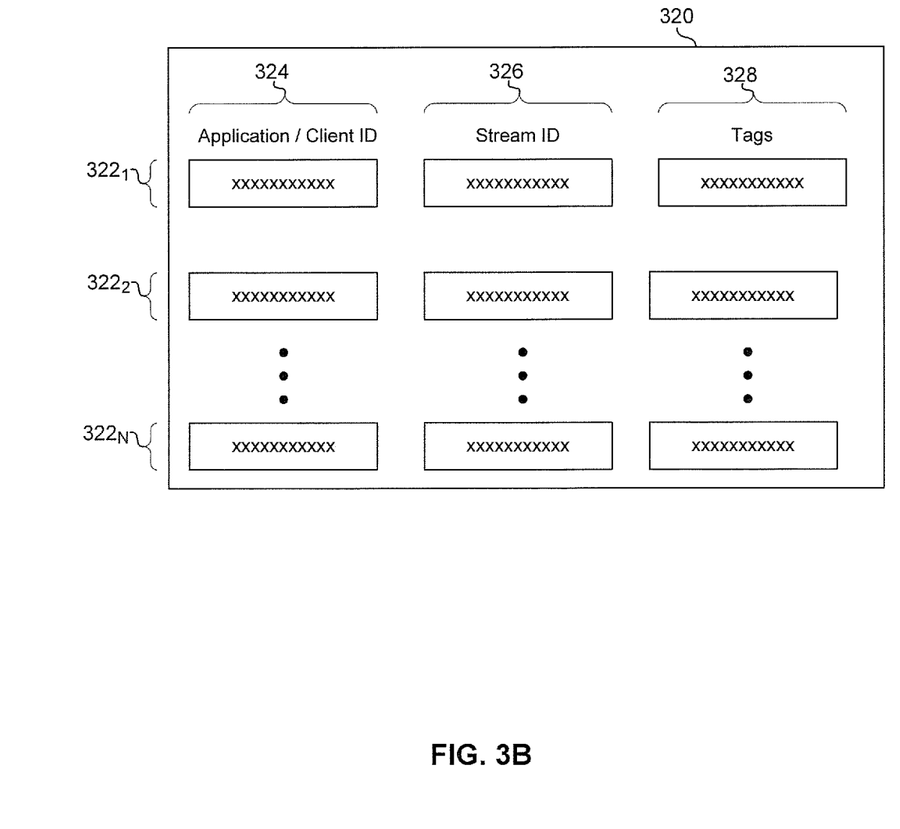
FIG. 3B is a block diagram illustrating an exemplary data structure for storing parameters associated with one or more applications and/or clients, in accordance with an embodiment of the invention.

FIG. 3B is a block diagram illustrating an exemplary data structure for storing parameters associated with one or more applications and/or clients, in accordance with an embodiment of the invention. Referring to FIG. 3B there is shown a table 320 which may be stored in the memory 214. For each datastream 302 that is handled by the networking subsystem 206, the table 320 may comprise a corresponding entry 322 that is stored therein. Each of the entries that are stored in the table may comprise an application and/or client identification field 324, a stream identification field 326, and a tags field 328.

The application and/or client identification field 324 may indicate an application and/or client that generates the datastream. In this manner, the table 320 may store tags associated with various applications that may run on a network device and/or various clients that may generate a datastream that is communicated to the network device. The stream identification field 326 may identify each data stream. In this manner, multiple datastreams from a single application or client may be tagged independently. The tags field 328 may indicate tags that are to be inserted in and/or appended to the packets having the corresponding application/client ID and/or stream ID.

Figure 4:
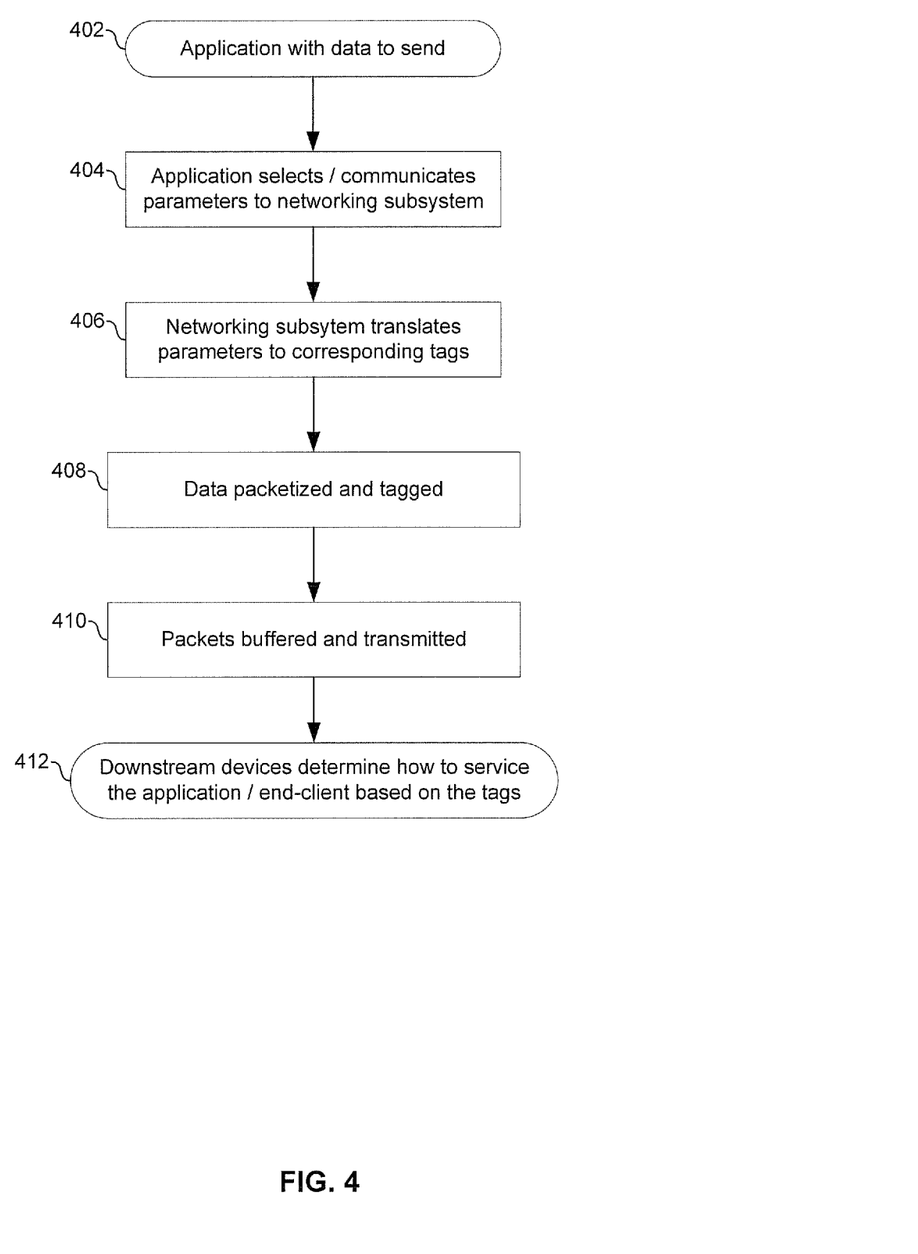
FIG. 4 is a flowchart illustrating exemplary steps for managing delivery of information in a network based on OSI layer 2 tags generated from application layer parameters, in accordance with an embodiment of the invention.

FIG. 4 is a flowchart illustrating exemplary steps for managing delivery of information in a network based on OSI layer 2 tags generated from application layer parameters, in accordance with an embodiment of the invention. Referring to FIG. 4 the exemplary steps may begin with step 402 when an application 202 running on a network device 112 (FIGS. 1 and 2) has data to transmit to the remote network device 102 (FIG. 1) across the network 106 (FIG. 1). Subsequent to step 402, the exemplary steps may advance to step 404.

In step 404, the application may select one or more parameter values from a set of parameter values that are supported by the networking subsystem. The parameter values may be selected based on, for example, an identity of application itself, the type of data being sent, the quality of service required for communicating the data to the network device 102, and protocols, at one or more of OSI layers 3 through 7, which are utilized to generate and packetize the data. Subsequent to step 404, the exemplary steps may advance to step 406.

In step 406, the networking subsystem 206 may translate the parameters into one or more corresponding tags. The translation may comprise, for example, configuring one or more registers which then generate the tags via hardware and/or logic and/or utilizing a look-up table indexed by the parameters or a hash or other mathematical or logical manipulation of the parameters. Subsequent to step 406, the exemplary steps may advance to step 408.

In step 408, the networking device may packetize the data and the tags may be inserted into and/or appended to the packets. In an exemplary embodiment of the invention, the data may be packetized in accordance with Ethernet standards and the tags may be inserted into one or more headers of the Ethernet frames. In an exemplary embodiment of the invention, a distinct Ethertype may be utilized to indicate the presence of the tags. In an exemplary embodiment of the invention, only a first packet of a packet stream may be tagged and subsequent packets of the packet stream may be processed as indicated by the tags in the first packet. Subsequent to step 408, the exemplary steps may advance to step 410.

In step 410, the tagged packets may be buffered and await transmission. In various embodiments of the invention, a queue in which the packets are buffered may depend on the tags of the packet. For example, the network device 112 may comprise queues that store data having different priorities and the priority of the packets may be determined by the packets. After the packets are read out from the queue(s) and transmitted, the exemplary steps may advance to step 412.

In step 412, downstream devices may be received the tagged packets and may be operable to service the packets based on inspection of the OSI layer 2 tags. In this regard, the network devices may be operable to provide quality of service and/or services required for communicating the packets without having to resort to deep packet inspection.

Figure 5:
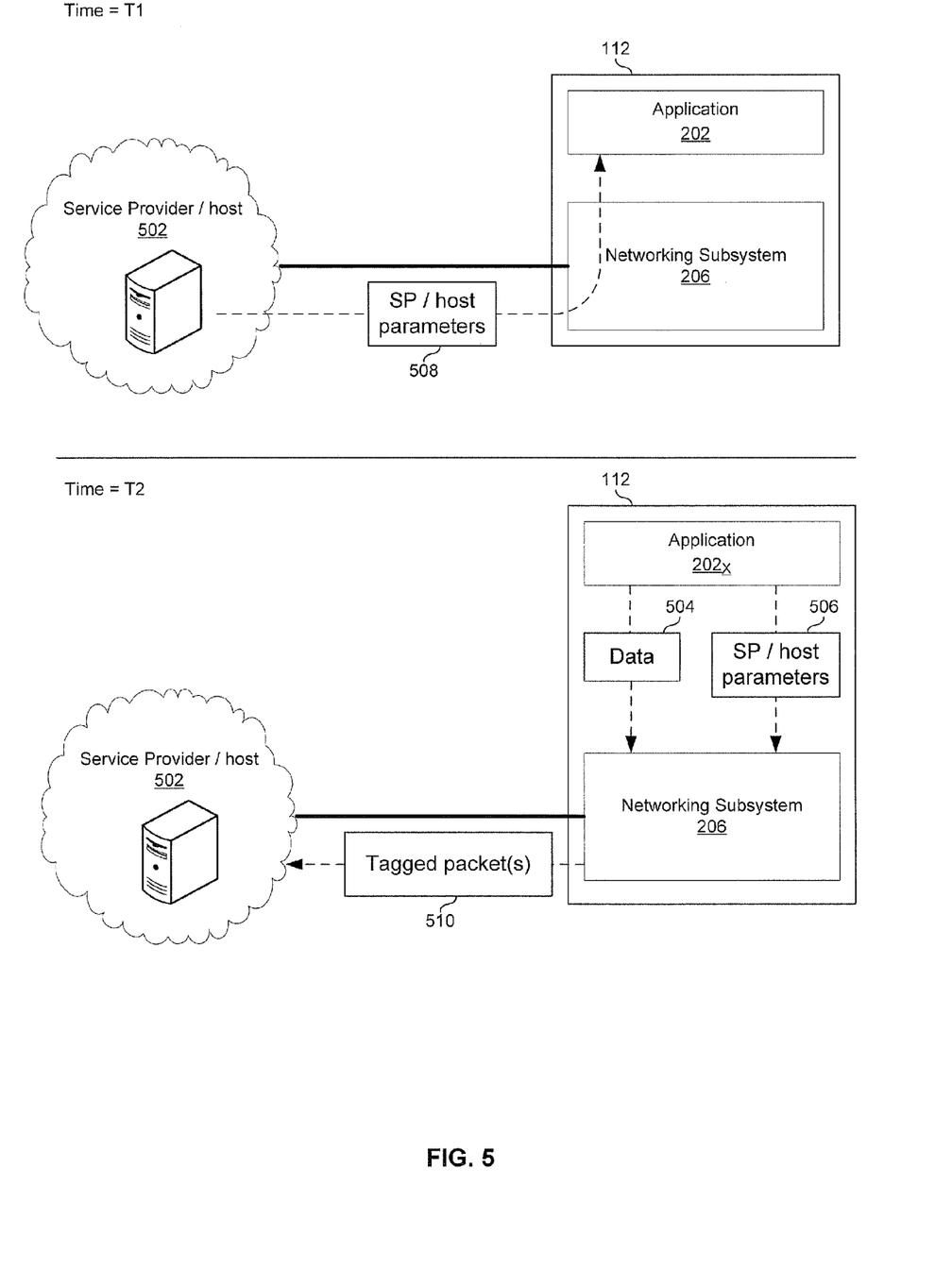
FIG. 5 is a block diagram illustrating communication of information based on host-specific parameters, in accordance with an embodiment of the invention.

FIG. 5 is a block diagram illustrating communicating of information based on host-specific parameters, in accordance with an embodiment of the invention. Referring to FIG. 5 there is shown the network device 112 and a service provider 502 at time instants T1 and T2.

The service provider 502 may comprise servers, headends, routers, switches, and/or other network devices operable to provide connectivity and/or other services to clients such as the end-system 112.

In operation, based on equipment, software, policies, and/or other attributes of the service provider 502, the service provider may be able to service certain data and/or protocols faster and/or more efficiently than other data and/or protocols, and/or may be unable or unwilling to handle certain data and/or protocols. For example, with regard to equipment, the service provider 502 may or may not comprise hardware capable of implementing audio video bridging (AVB) protocols including IEEE 802.1AS, IEEE 802.1Qat, and IEEE 802.1Qav. Accordingly, whether the service provider 502 supports AVB may determine whether the service provider 502 can provide the required quality of service to a packet stream. For another example, with regard to software, an operating system running devices belonging to the service provider 502 may determine applications and/or protocols for which associated data may be supported. With regard to policies, the service provider 502 may, for example, handle and/or service data based on a content provider associated with the data, the service provider 502 may refuse to handle traffic associated with another service provider, and/or the service provider 502 may handle the data based on subscriptions of the end-client generating the data. Other attributes of the service provider 502 that may impact servicing and/or handling of the data may comprise current load and/or available resources of the service provider 502. Accordingly, the service provider 502 may provide parameters to end-systems serviced by the service provider 502, and the end-system may utilize the parameters when generating data to be transmitted to service provider and when tagging packets comprising such data.

For example, at time instant T1 the service provider 502 may send the parameters 508 to the application 202, where the parameters 508 indicate preferences, capabilities, and/or other attributes of the service provider 502. The application 202 may receive the parameters 508 may utilize the parameters 508 when generating data 504 to be transmitted to the content provider.

At time instant T2 the application may communicate the data 504 to the networking subsystem 206 along with the corresponding parameters 506. The parameters 506 associated with the data 504 may comprise the parameters 508 and/or parameters derived from the parameters 508. The networking subsystem 206 may packetize the data 504, tags the resulting packets, and send the tagged packets 510 to the service provider 502.

Thus, aspects of method and system for packetizing data for servicing traffic end-to-end are provided. In an exemplary embodiment of the invention, a networking subsystem 206 may receive, from an application $202_X$, one or more parameter values $304_X$ associated with data $302_X$ generated by the application $202_X$. The networking subsystem 206 may packetize the data $302_X$ into one or more packets $312_X$. The networking subsystem 206 may translate the received one or more parameter values $304_X$ into one or more corresponding OSI layer 2 tags $306_X$. The networking subsystem 206 may tag the one or more packets $312_X$ with the corresponding OSI layer 2 tags $306_X$ and transmit the tagged packet(s) $312_X$ to one or more link partners 104. The link partners 104 may thus process and forward the tagged packet(s) $312_X$ by inspecting only OSI layer 2 information of the tagged packet(s) $312_X$. The value(s) of the parameter(s) $304_X$ may be translated based, at least in part, on other data $302_Y$ being communicated by the networking subsystem 206. The received data $302_X$ from the application $202_X$ and the other data $302_Y$ being transmitted by the networking subsystem 206 may be prioritized by the networking subsystem 206.

The parameter values $304_X$ and $304_Y$ may be stored in memory 214 within the networking subsystem 206, wherein the memory 214 may comprise corresponding parameter values $304_X$ and $304_Y$ associated with each of the applications $202_X$ and $202_Y$. The one or more corresponding OSI layer 2 tags may indicate quality of service required for communicating the data to the one or more link partners. The one or more corresponding OSI layer 2 tags $306_X$ may indicate one or more of: OSI layer 3 protocols, OSI layer 4 protocols, OSI layer 5 protocols, OSI layer 6 protocols, and OSI layer 7 protocols utilized for generating the one or more packets $312_X$. The one or more corresponding OSI layer 2 tags $306_X$ and $306_Y$ may, respectively, identify the applications $202_X$ and $202_Y$ generating the data. The data $302_X$ may be associated with multiple datastreams and each of said multiple datastreams may be associated with different ones of the received one or more values $304_X$. The parameter values $304_X$ and $304_Y$ may be translated into the one or more tags $306_X$ and $306_Y$, respectively, via dedicated hardware in the networking subsystem 206. The values of parameters 506 may be determined by a link partner 502 to which the one or more packets 510 are communicated.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for packetizing data for servicing traffic end-to-end.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a network device:
   receiving a service provider network parameter sent by a service provider to the network device, the service provider network parameter specifying a capability of the service provider;
   packetizing, into a first packet, first data generated by a first application running on the network device, the first data associated with a first datastream;
   receiving, from the first application, a first selected parameter value for the service provider network parameter, the first selected parameter value associated with the first datastream;
   packetizing into a second packet, second data associated with a second datastream different from the first datastream;
   receiving a second selected parameter value for the service provider network parameter, the second selected parameter value associated with the second datastream;
   generating a first tag for the first packet by taking into account both the first selected parameter value associated with the first datastream and the second selected parameter value associated with the second datastream;
   generating a second tag for the second packet by taking into account at least the second selected parameter value associated with the second datastream;

tagging the first packet with the first tag and tagging the second with the second tag to obtain tagged packets; and transmitting the tagged packets to the service provider.

2. The method according to claim 1, wherein the first tag indicates a quality of service required for communicating the first data to the service provider.

3. The method according to claim 1, wherein the first tag indicates one or more of:
an OSI layer 2 protocol utilized for generating the first packet;
an OSI layer 3 protocol utilized for generating the first packet;
an OSI layer 4 protocol utilized for generating the first packet;
an OSI layer 5 protocol utilized for generating the first packet;
an OSI layer 6 protocol utilized for generating the first packet;
an OSI layer 7 protocol utilized for generating the first packet, or any combination thereof.

4. The method according to claim 1, wherein the first tag identifies the first application.

5. The method of claim 1, wherein the service provider network parameter specifies a particular protocol that the service provider services more efficiently than another protocol or a particular protocol the service provider services more quickly than another protocol.

6. The method of claim 1, wherein the service provider network parameter specifies a current load of the service provider, available resources of the service provider, or both.

7. The method of claim 1, wherein the service provider network parameter specifies a particular protocol the service provider is unwilling to handle.

8. The method of claim 1, wherein the second data is also generated by the first application; and
wherein receiving the second selected parameter value comprises receiving the second selected parameter value from the first application.

9. The method of claim 1, wherein the second data is generated by a second application running on the network device; and
wherein receiving the second selected parameter value comprises receiving the second selected parameter value from the second application.

10. The method of claim 1, wherein generating the second tag for the second packet further comprises taking into account the first selected parameter value associated with the first datastream, in addition to the second selected parameter value associated with the first datastream, to enable prioritizing between the first datastream and the second datastream.

11. A system comprising:
a network device operable to:
receive a service provider network parameter sent by a service provider to the network device, the service provider network parameter specifying a capability of the service provider;
packetize, into a first packet, first data generated by a first application running on the network device, the first data associated with a first datastream from the first application;
receive a first selected value for the service provider network parameter from the first application, the first selected value corresponding to first data associated with the first datastream;

packetize, into a second packet, second data associated with a second datastream, the second datastream different from the first datastream;
receive a second selected value for the service provider network parameter, the second selected value corresponding to second data associated with the second datastream;
generate a first tag for the first packet by taking into account both the first selected parameter value associated with the first datastream and the second selected parameter value associated with the second datastream;
generate a second tag for the second packet by taking into account at least the second selected parameter value associated with the second datastream;
tag the first packet with the first tag and the second packet with the second tag to obtain tagged packets; and
transmit the tagged packets to the service provider.

12. The system according to claim 11, wherein the first and second tags indicate a respective quality of service required for communicating the first and second data to the service provider.

13. The system according to claim 11, wherein the first tag indicates one or more of:
an OSI layer 2 protocol utilized for generating the first packet;
an OSI layer 3 protocol utilized for generating the first packet;
an OSI layer 4 protocol utilized for generating the first packet;
an OSI layer 5 protocol utilized for generating the first packet;
an OSI layer 6 protocol utilized for generating the first packet;
an OSI layer 7 protocol utilized for generating the first packet, or any combination thereof.

14. The system of claim 11, wherein the service provider network parameter specifies a particular protocol that the service provider services more efficiently than another protocol or a particular protocol the service provider services more quickly than another protocol.

15. The system of claim 11, wherein the service provider network parameter specifies a current load of the service provider, available resources of the service provider, or both.

16. The system of claim 11, wherein the service provider network parameter specifies a particular protocol the service provider is unwilling to handle.

17. The system of claim 11, wherein the second data is also generated by the first application; and
wherein the network device is operable to receive the second selected parameter value by receiving the second selected parameter value from the first application.

18. The system of claim 11, wherein the second data is generated by a second application; and
wherein the network device is operable to receive the second selected parameter value by receiving the second selected parameter value from the second application.

19. The system of claim 11, wherein the network device is operable to generate the second tag for the second packet by further taking into account the first selected parameter value associated with the first datastream, in addition to the second selected parameter value associated with the first datastream, to enable prioritizing between the first datastream and the second datastream.

20. A product comprising:
a non-transitory machine readable medium storing processor executable instructions, that when executed, cause a processor to:
  receive a service provider network parameter sent by a service provider, the service provider network parameter specifying a capability of the service provider;
  packetize, into a first packet, first data generated by a first application, the first data associated with a first datastream from the first application;
  receive a first selected value for the service provider network parameter from the first application, the first selected value corresponding to first data associated with the first datastream;
  packetize, into a second packet, second data associated with a second datastream, the second datastream different from the first datastream;
  receive a second selected value for the service provider network parameter, the second selected value corresponding to second data associated with the second datastream;
  generate a first tag for the first packet by taking into account both the first selected parameter value associated with the first datastream and the second selected parameter value associated with the second datastream;
  generate a second tag for the second packet by taking into account at least the second selected parameter value associated with the second datastream;
  tag the first packet with the first tag and the second packet with the second tag to obtain tagged packets; and
  transmit the tagged packets to the service provider.

21. The product of claim 20, wherein the service provider network parameter specifies a particular protocol that the service provider can service more efficiently than another protocol or a particular protocol the service provider can service more quickly than another protocol.

* * * * *